United States Patent [19]

Nakamae et al.

[11] Patent Number: 5,599,870
[45] Date of Patent: Feb. 4, 1997

[54] AQUEOUS EMULSION

[75] Inventors: Masato Nakamae; Naoki Fujiwara, both of Kurashiki; Kazutoshi Terada; Daisuke Miyake, both of Osaka; Ken Yuki, Kurashiki; Toshiaki Sato; Hitoshi Maruyama, both of Kurashiki, all of Japan

[73] Assignee: Kuraray Co., Ltd., Kurashiki, Japan

[21] Appl. No.: 407,670

[22] Filed: Mar. 21, 1995

[30] Foreign Application Priority Data

Jul. 14, 1994 [JP] Japan ................................. 6-161860

[51] Int. Cl.$^6$ ............................. B01F 17/52; C08L 29/04
[52] U.S. Cl. ...................... 524/503; 252/312; 252/356; 524/459; 524/803; 526/331; 526/911; 526/912
[58] Field of Search ..................... 252/312, 356; 524/459, 803, 35, 45, 503; 526/331, 911, 932

[56] References Cited

U.S. PATENT DOCUMENTS

| | | | |
|---|---|---|---|
| 2,467,774 | 4/1949 | Plambeck, Jr. | 526/331 X |
| 3,497,521 | 2/1970 | Bouchard | 524/459 |
| 3,578,618 | 5/1971 | Beardsley | 526/331 X |
| 3,661,696 | 5/1972 | Knutson | 524/459 |
| 4,521,561 | 6/1985 | Hausman et al. | 524/459 |
| 4,921,898 | 5/1990 | Lenney et al. | 524/459 |
| 5,308,910 | 5/1994 | Yuki et al. | 524/503 |
| 5,387,683 | 2/1995 | Burdeska et al. | 544/219 |

FOREIGN PATENT DOCUMENTS 6-080709  3/1994  Japan.

OTHER PUBLICATIONS

Chemical Abstracts, vol. 121, No. 8, Aug. 22, 1994, AN 84798u, "Dispersing Agents for Pigments and Emulsion and Suspension Polymerization of Vinyl Compounds".

*Primary Examiner*—Richard D. Lovering
*Attorney, Agent, or Firm*—Oblon, Spivak, McClelland, Maier & Neustadt, P.C.

[57] ABSTRACT

The present invention relates to an aqueous emulsion comprising a dispersant of a modified polyvinyl alcohol with an ethylene unit content of 2 to 9 mol % and a degree of hydrolysis of at least 95 mol %, a dispersoid of a polymer of an ethylenically unsaturated monomer, and a ratio ($\eta 2$ rpm/$\eta 20$ rpm) of Brookfield viscosity at 30° C., 2 rpm ($\eta 2$ rpm) as against Brookfield viscosity at 30° C., 20 rpm ($\eta 20$ rpm) being 1 to 1.8 when the latter viscosity ($\eta 20$ rpm) is adjusted to 5,000 to 10,000 mPa·S.

The aqueous emulsion according to the present invention is excellent in structural viscosity (flowability, high speed application performance), provides coated layers with high water resistance and low-temperature stability, and can be suitably used extensively as an adhesive for paper, wood and plastics, as a binder for impregnated paper and non-woven products, as an additive for mortar, as a paint, and in paper and fiber processings.

20 Claims, No Drawings

AQUEOUS EMULSION

BACKGROUND OF THE INVENTION

1. Field of the Invention

The present invention relates to an aqueous emulsion, and more particularly to an aqueous emulsion which is excellent in high speed application properties, water-resistant adhesion properties and low-temperature stability.

2. Description of the Prior Art

Polyvinyl alcohol (hereinafter referred to as PVA) has heretofore been commonly used as a protective colloid for emulsion polymerization of ethylenically unsaturated monomers, particularly vinyl esters such as vinyl acetate. Aqueous emulsion containing as the dispersoid polyvinyl ester which is obtained in emulsion polymerization using PVA as the protective colloid has a very wide range of use as an adhesive for paper, wood and plastics; as a binder for impregnated paper, non-woven fabric product; and for many other uses such as mortar additive, mortar interlaminar bonding binder, and paints and in paper and fiber processing.

PVAs used as a dispersant for emulsion polymerization are classified into a "completely hydrolyzed PVA" with the degree of hydrolysis of approximately 98 mol % and a "partially hydrolyzed PVA" with the degree of hydrolysis of approximately 88 mol %. Emulsions obtained in emulsion polymerization using the completely hydrolyzed PVA as dispersant have relatively high water resistance and flowability (high speed application property). Aqueous emulsions of this type are, however, defective in that their viscosity radically increases when left standing at low temperatures and that they are easily subject to gelation. Emulsions obtained in emulsion polymerization using the partially hydrolyzed PVA as dispersant, on the other hand, are improved in terms of viscosity increase that may occur when left standing at low temperatures or in terms of gelation tendency, but they are inferior in water resistance when used as a coating agent and in flowability (including viscosity fluctuation due to changes in the application speed and splashing of the liquid at higher application speed).

In order to obviate the problems encountered in the prior art, there have been proposed combined use of PVAs with different degrees of hydrolysis or use of PVA of which degree of hydrolysis is intermediate between completely hydrolyzed and partially hydrolyzed. However, there is no PVA that satisfies various requirements all at once, such as water resistance as a coating material, high speed application property, less temperature-dependent emulsion viscosity and low-temperature stability. Addition of urea resin and various cross-linking agents to emulsions obtained by emulsion polymerization using partially hydrolyzed PVA as the dispersant has been proposed to improve the water resistance of the resultant coating. This improves the water resistance of the coating to a certain extent but entails a problem of inferior work efficiency due to increased viscosity. It is also known to use a dispersant of modified PVA containing 1 to 10 mol % of α-olein unit with a number of carbon atoms of 4 or less in order to improve the water resistance of the coating and the less temperature-dependent emulsion viscosity. However, an aqueous emulsion which is excellent both in water resistance and flowability (high speed application property) has never been made available (JPA Laid-open No. 80709, 1994).

It is therefore an object of the present invention to provide an aqueous emulsion with excellent flowability (high speed application property), water resistant adhesion property and low-temperature stability while maintaining the advantageous features of an aqueous emulsion containing PVA as protective colloid such as high viscosity, excellent mechanical stability, excellent work efficiency and high initial adhesive strength.

Another object of the present invention is to provide an adhesive with particularly good water resistance. Still another object is to provide a dispersant for emulsion polymerization for producing said aqueous emulsion having excellent physical properties.

SUMMARY OF THE INVENTION

Having intensively studied the problems mentioned above, the present inventors have contrived the present invention, which includes an aqueous emulsion comprising a dispersant of a modified PVA with an ethylene unit content of 2 to 9 mol % and a degree of hydrolysis at least 95 mol %, a dispersoid of a polymer of an ethylenically unsaturated monomer, and a ratio ($\eta 2$ rpm/$\eta 20$ rpm) of Brookfield viscosity at 30° C., 2 rpm ($\eta 2$ rpm) as against Brookfield viscosity at 30° C., 20 rpm ($\eta 20$ rpm) being 1 to 1.8 when the latter viscosity ($\eta 20$ rpm) is adjusted at 5,000 to 10,000 mPa·S (millipascal-second); an adhesive comprising said aqueous emulsion; and a dispersant for emulsion polymerization of an ethylenically unsaturated monomer comprising a modified PVA with an ethylene unit content of 2 to 9 mol % and a degree of hydrolysis of at least 95 mol %.

BRIEF DESCRIPTION OF THE PREFERRED EMBODIMENT

The modified PVA to be used as a dispersant in the present invention has an ethylene unit content of 2 to 9 mol % (preferably 3 to 8 mol %) and a degree of hydrolysis of at least 95 mol % (preferably 95 to 99.5 mol %, and still more preferably 96 to 99.5 mol %). In case the ethylene unit content is less than 2 mol %, water resistance and low-temperature stability of coating decreases, whereas if the ethylene unit content is set at more than 9 mol %, water solubility decreases and resultant aqueous emulsion lacks stability. In case the degree of hydrolysis is less than 95 mol %, flowability and water resistance of coating decrease, whereas if the degree of hydrolysis is more than 99.5 mol %, emulsion polymerization becomes difficult and the resultant aqueous emulsion will have poor low-temperature stability. The viscosity-average degree of polymerization (hereinafter referred to as degree of polymerization) of the modified PVA is preferably 100 to 8,000 and more preferably 300 to 3,000. If the degree of polymerization is less than 100, the modified PVA will fail to properly function as a protective colloid, while if the degree of polymerization is more than 8,000, it becomes difficult to produce the modified PVA on an industrial scale.

In obtaining the aqueous emulsion according to the present invention, interfacial activity of the modified PVA to be used as the dispersant plays an important role, and thus the surface tension of an aqueous solution of the modified PVA at 1 weight % (20° C.) needs to be 52 to 61 dyne/cm. In case the surface tension is more than 61 dyne/cm, the interfacial activity decreases and the resultant emulsion lacks stability. If the surface tension is less than 52 dyne/cm, the interfacial activity becomes excessively high, making it impossible to obtain an emulsion with good flowability.

The above mentioned modified PVA is used as the dispersant for the aqueous emulsion according to the present invention, and conventional anionic, nonionic or cationic surfactants, PVA and hydroxyethyl cellulose may be used in combination so long as the effect of the present invention is not impaired.

The modified PVA according to the present invention is obtained by hydrolysis of a copolymer of vinyl ester and ethylene. Examples of vinyl ester include vinyl formate, vinyl acetate, vinyl propionate and vinyl pivalate, but vinyl acetate is preferred.

The modified PVA according to the present invention may be a copolymer of ethylenically unsaturated monomer so long as the effect of the present invention is not impaired. Examples of such ethylenically unsaturated monomer include acrylic acid, methacrylic acid, (anhydrous) phthalic acid, (anhydrous) maleic acid, (anhydrous) itaconic acid, acrylonitryl, methacrylonitril, acrylamide, methacrylamide, trimethyl-(3-acrylamide-3-dimethylpropyl)ammonium chloride, acrylamide-2-methylpropane sulfonate and sodium salt thereof, ethylvinyl ether, butylvinyl ether, N-vinyl pyrrolidone, vinyl chloride, vinyl bromide, vinyl fluoride, vinylidene chloride, vinylidene fluoride, tetrafluoroethylene, vinyl sodium sulfonate, and aryl sodium sulfonate.

It is also possible to use an end group modified PVA which is obtained by copolymerization of vinyl ester monomer with ethylene in the presence of a thiol compound such as thiolacetic acid and mercaptopropionic acid and by subsequent hydrolysis.

According to the present invention, modification of PVA is most preferably achieved using ethylene alone. In case the present invention modified PVA is to be further modified using comonomer other than ethylene, it is preferable that the content of said comonomer is less than 1 mol %, more preferably less than 0.5 mol % and still more preferably less than 0.1 mol %.

Various types of polymers may be used as ethylenically unsaturated monomer as the dispersoid of the present invention. Preferable examples of ethylenically unsaturated monomer as the starting material for the polymer dispersoid include olefins such as ethylene, propylene and isobutylene; halogenated olefins such as vinyl chloride, vinyl fluoride, vinylidene chloride, and vinylidene fluoride; vinyl esters such as vinyl formate, vinyl acetate, vinyl propionate, and vinyl versatate; acrylic esters such as acrylic acid, methacrylic acid, methyl acrylate, ethyl acrylate, butyl acrylate, acrylate-2-ethylhexyl, dodecyl acrylate, and acrylate-2-hydroxyethyl; methacrylic esters such as methyl methacrylate, ethyl methacrylate, butyl methacrylate, methacrylate-2-ethylhexyl, dodecyl methacrylate, and methacrylate-2-hydroxyethyl; dimethylaminoethyl acrylate, dimethylaminoethyl methacrylate and quaternary compounds thereof; monomers of acrylamide such as acrylamide, methacrylamide, N-methylolacrylamide, N,N-dimethylacrylamide, acrylamide-2-methylpropane sulfonate and sodium salts thereof; monomers of styrene such as styrene, α-methylstyrene, p-styrene sulfonate and sodium or potassium salts thereof; N-vinyl pyrrolidone; and monomers of diene such as buthadiene, isoprene, and chloroprene. These monomers may be used alone or in combination of two or more.

Among the ethylenically unsaturated monomers listed above, vinyl esters, (metha)acrylic esters and monomers of styrene and diene are preferable, particularly vinyl esters used alone, and combinations of ethylene and vinyl ester and of vinyl ester and (metha)acrylic ester.

When the Brookfield viscosity at 30° C., 20 rpm (η20 rpm) is adjusted to 5,000 to 10,000 mPa·S, the ratio (η2 rpm/η20 rpm) of the Brookfield viscosity at 30° C., 2 rpm (η2 rpm) as against the Brookfield viscosity at 30° C., 20 rpm (η20 rpm) is preferably 1 to 1.8 (preferably 1 to 1.4 and more preferably 1 to 1.3). If the ratio (η2 rpm/η20 rpm) (hereinafter referred to as the structural viscosity) is greater than 1.8, coating weight may fluctuate excessively when the speed of emulsion application changes, resulting in decreased water resistance of the coating. It is noted that when the Brookfield viscosity is within the range of 5,000 to 10,000 mPa·S, the structural viscosity value is substantially uniform. It is therefore sufficient for the present invention that said value is 1 to 1.8 at least at one point within said viscosity range.

The following method may be employed to adjust the Brookfield viscosity at 30° C., 20 rpm (η20 rpm) to fall within the range of 5,000 to 10,000 mPa·S in order to measure the structural viscosity of the aqueous emulsion according to the present invention.

(1) When the aqueous emulsion has high viscosity: Water is added to dilute the aqueous emulsion while its concentration and viscosity are being measured. Viscosity as relative to the concentration is determined, and the viscosity is adjusted to a desired level.

(2) When the aqueous emulsion has low viscosity: The aqueous emulsion is concentrated in a reduced pressure evaporator while its concentration and viscosity are being measured. Viscosity as relative to the concentration is determined, and the viscosity is adjusted to a desired level.

The Brookfield viscosity at 30° C., 20 rpm of 5,000 to 10,000 mPa·S specified in the present invention is a standard value for aqueous emulsions used on industrial scale.

Concentration of the solid content in the aqueous emulsion is normally 40 to 60 weight % (preferably 45 to 55 wt %), and the particle diameter of the dispersoid is 0.01 to 5 μm (preferably 0.1 to 3 μm).

The aqueous emulsion of the present invention can be obtained by emulsion polymerization of ethylenically unsaturated monomer using said modified PVA as dispersant, the polymerization process including the steps of adding either in one charge or continuously (preferably continuously) the ethylenically unsaturated monomer in the presence of known polymerization initiator. It is also possible to subject the ethylenically unsaturated monomer to preliminary emulsification using an aqueous solution of the modified PVA of the present invention and then continuously add the resultant emulsion to the polymerization system.

There is no specific limit to the amount of modified PVA to be used as a dispersant, but it is preferably 1 to 30 parts by weight and more preferably 2 to 20 wt parts as against 100 parts by weight of the ethylenically unsaturated monomer. If the amount of modified PVA falls outside said range of 1 to 30 parts by weight, polymerization stability is deteriorated and the initial adhesion strength and water resistant adhesion property may deteriorate.

Although the aqueous emulsion according to the present invention may be used as it is, various types of prior art emulsions in combination with the present invention emulsion may be used to suit the need so long as it will not impair the effect of the present invention.

Explanation will now follow regarding adhesives for which the aqueous emulsion of the present invention is best suited.

The adhesive according to the present invention basically comprises the aqueous emulsion mentioned above, but various additives commonly used for adhesives may suitably be combined to adjust the drying and setting performances, viscosity, and film forming property. Examples of such addition include various organic solvents such as toluene, tetrachloroethylene, dichlorobenzene, and trichlorobenzene; water soluble polymers such as starch, modified starch, oxidized starch, sodium alginate, carboxymethyl cellulose, methyl cellulose, hydroxymethyl cellulose, and copolymers of maleic anhydride and isobutene, of maleic anhydride and styrene and of maleic anhydride and methyl vinyl ether; and thermosetting resins commonly used as an adhesive such as urea-formalin resin, urea-melamine-formalin resin, and phenol-formalin resin.

Various other additives may also be suitably used in the adhesive according to the present invention. They include fillers such as clay, kaolin, talc, calcium carbonate and wood meal; extenders such as flour; reaction accelerators such as boric acid and aluminum sulfate; pigments such as titanium oxide, as well as defoaming agents, dispersants, anti-freezing agents, preservatives, and anti-corrosion agents.

The aqueous emulsion according to the present invention is excellent in structural viscosity (flowability and high speed application property), and water resistance and low-temperature stability of the coating. It offers a wide range of uses such as adhesive for paper, wood work and plastics; binders for impregnated paper and non-woven fabric products; admixtures and binders for mortar, and in paper and fiber processings.

EXAMPLES

The present invention will now be described in more detail by way of examples and comparative examples. Unless otherwise specified, the terms "part" and "%" used in the following description shall mean a value based on the weight. The structural viscosity (high speed application property, shear rate-dependent emulsion viscosity), water resistant adhesion property and low-temperature stability of the emulsion obtained were evaluated in accordance with the methods described below.

(1) Structural viscosity

The Brookfield viscosity at 30° C., 20 rpm was adjusted to fall within the range of 5,000 to 10,000 mPa·S by adding water to the emulsion if the viscosity was high, or alternately by concentrating the emulsion in a reduced pressure evaporator if the viscosity was low.

The Brookfield viscosity values at 30° C., 2 rpm ($\eta 2$ rpm) and at 30° C., 20 rpm ($\eta 20$ rpm) were measured using the Brookfield viscometer. The structural viscosity value was obtained from the following equation.

Structural viscosity value of the aqueous emulsion=$\eta 2$ rpm/$\eta 20$ rpm

Emulsions having a structural viscosity value (2 rpm/20 rpm) of 1 to 1.8 are excellent in application property and facilitate high speed application.

(2) water resistant adhesion property

A composition was prepared by compounding 10 parts of dibutyl phthalate into the aqueous emulsion of 100 parts of its solid content. The composition was applied on a sheet of liner paper for the amount of 50 g/m$^2$ (amount of application in wet state) using a bar coater. The liner paper was pasted with another sheet of the same kind of paper, gently pressed with a hand roller for adhesion and left for curing for 24 hours at 20° C. and at the relative humidity (RH) of 65% to obtain a test specimen.

The specimen was immersed in water at 30° C. for 24 hours and then peeled off according to the method of T-peel. The water resistant adhesion property was evaluated by observation of the peeled surface.

The result is indicated by the following marks:

⊚: At more than 75% of the adhesion area, the liner paper was broken o: At 20 to 50% of adhesion area, the liner paper was broken Δ: Only ply separation at the adhesion layer was observed X: Spontaneous peeling (peeling occurred without any stress)

(3) Low-temperature stability

Viscosity of the aqueous emulsion was adjusted to the level used for the measurement of the structural viscosity. The emulsion was charged in a 100 ml glass sample tube and left standing at 0° C. for one day. Viscosity of the emulsion after being left standing at 0° C. for one day ($\eta 0$ deg) was measured, and its ratio as against the viscosity at 30° C. before being left standing at 0° C. ($\eta 30$ deg) was calculated; the viscosity increase ratio at low temperature=$\eta 0$ deg/$\eta 30$ deg. Measurement was conducted at 0° C., 20 rpm and 30° C., 20 rpm using a Brookfield viscometer.

The result is indicated by the following marks:

⊚: $\eta 0$ deg/$\eta 30$ deg=5.5 to 6.4 o: $\eta 0$ deg/$\eta 30$ deg=7 to 10

Δ: 0 deg/30 deg=11 to 19

X: 0 deg/30 deg$\geq$20

(4) Surface tension

A 1% aqueous solution of the modified PVA was prepared and left standing at 20° C. for 60 minutes and the surface tension was measured by Wilhelmy's method (the plate method).

Example 1

(Production of ethylene modified PVA)

Into a 100 liter high pressure reaction vessel provided with a stirrer, inlet ports for nitrogen, ethylene and an initiator were charged 50 kg of vinyl acetate and 9.2 kg of methanol and the system was heated to 60° C. The reaction was carried out after nitrogen was bubbled for 30 minutes. Ethylene was then charged until the pressure of the reaction vessel reached 6 kg/cm$^2$. A solution containing 2,2'-azobis(4-methoxy-2,4-dimethylvaleronitrile) with the concentration of 1.4 g/liter was prepared as an initiator, which was subjected to nitrogen bubbling. After the inner temperature of the vessel was adjusted to 60° C., 56 ml of the initiator solution was charged to initiate polymerization. Throughout the polymerization process, ethylene was introduced to maintain the pressure of the vessel at 6 kg/cm$^2$ and the polymerization temperature at 60° C. The initiator solution was continuously added to the system at the rate of 180 ml/hr. Polymerization reaction was suspended after six hours when the conversion reached 40% by cooling the system. The reaction vessel was adjusted to the normal pressure to eliminate ethylene. Nitrogen gas was bubbled into the system to completely remove ethylene. Unreacted vinyl acetate monomer was removed under a reduced pressure to obtain a methanol solution. A methanol solution of modified polyvinyl ester (PVAc) adjusted to 20% was added with a NaOH methanol solution (10% concentration) with the mole ratio of 0.05 to give rise to hydrolysis. The degree of hydrolysis of the resultant modified PVA was 98.0 mol %. Surface tension of the 1% aqueous solution of the modified PVA was measured to be 57.9 dyne/cm at 20° C.

A methanol solution of the modified PVAc obtained by removing the unreacted vinyl acetate monomer was precipitated using n-hexane and then dissolved with acetone for re-precipitation-refining. The procedure was repeated for three times. Refined modified PVAc was then obtained by drying under reduced pressure at 60° C. Ethylene unit content was 5.5 mol % when measured based on alkali consumption of the modified PVAc. Methanol solution of the modified PVAc was hydrolyzed at the alkali mole ratio of 0.2, subjected to Soxhlet extraction with methanol for three days and dried to obtain refined modified PVA. Degree of polymerization of the modified PVA was 1,400 when measured according to JIS-K6726. The melting point of the modified PVA was 224° C.

(Emulsion polymerization of vinyl acetate)

Into a 5-liter glass lining polymerization vessel provided with a reflux condenser, a dropping funnel, a thermometer, and a nitrogen inlet port were charged 1,400 g of ion-exchanged water and 225 g of ethylene-modified PVA (degree of polymerization: 1,400; degree of hydrolysis: 98.0 mol %; ethylene unit content: 5.5 mol %), and the resultant mixture was completely dissolved at 95° C. The aqueous solution of the modified PVA was cooled and adjusted to pH 4, added with 0.05 g of ferrous chloride, bubbled with nitrogen, charged with 350 g of vinyl acetate under agitation at 140 rpm, and then heated to 60° C. Aqueous solution of 0.7% hydrogen peroxide and aqueous solution of 6% Rongalit were continuously added at 15 ml/hr and at 10 ml/hr respectively during polymerization at a temperature between 70° and 80° C. After 30 minutes from the start of polymerization, 1,400 g of vinyl acetate was added continuously for three hours. Upon completion of addition, the inner temperature of the system was maintained at 80° C. for one hour to complete the polymerization. Stable aqueous emulsion of polyvinyl acetate with the solid concentration of 50.4% and viscosity of 23,000 mPa·S was obtained. The viscosity of the aqueous emulsion at 30° C., 20 rpm was adjusted to fall within the range of 5,000 to 10,000 mPa·S, and the structural viscosity value and the low-temperature stability were evaluated.

The results are shown in Tables 1 and 2.

Examples 2 to 8

Emulsion polymerization of vinyl acetate was conducted in the same manner as described in Example 1 except that the dispersant and the polymerization conditions listed in Table 1 were employed. The resultant aqueous emulsion was evaluated. The results are shown in Tables 1 and 2.

Example 9

Into a 1-liter glass lining polymerization vessel provided with a reflux condenser, a dropping funnel, a thermometer, and a nitrogen inlet port were charged 400 g of ion-exchanged water and 40 g of ethylene-modified PVA (degree of polymerization: 1,400; degree of hydrolysis: 98.5 mol %; ethylene unit content: 4.5 mol %), and the resultant mixture was completely dissolved at 95° C. The aqueous solution of the modified PVA was cooled, bubbled with nitrogen, added with 40 g of vinyl acetate under agitation at 140 rpm, and then heated to 60° C. Polymerization reaction was initiated in the presence of a redox initiator of hydrogen peroxide and tartaric acid. After 15 minutes from the start of polymerization, 360 g of vinyl acetate was continuously added for three hours to complete the polymerization. Stable aqueous emulsion of polyvinyl acetate with the solid concentration of 50.4% and viscosity of 4,500 mPa·S was obtained. Results of evaluation are shown in Tables 1 and 2.

Example 10

Ethylene modified PVA (degree of polymerization: 1750; degree of hydrolysis: 98.7 mol %; ethylene unit content: 3.0 mol %) weighing 21 g was dissolved in 290 g of ion-exchanged water by heating. The mixture was charged into a high pressure autoclave provided with a nitrogen inlet port and a thermometer. After adjusted to pH4 with dilute sulfuric acid, the system was added with 300 g of vinyl acetate. Ethylene pressure was raised to 45 kg/cm$^2$G (amount of ethylene copolymerized corresponds to 60 g). After the temperature was raised to 60° C., polymerization was started using a redox initiator of hydrogen peroxide and Rongalit. After two hours when the concentration of residual vinyl acetate reached 0.6%, the polymerization was terminated. Stable aqueous emulsion comprising copolymer of ethylene and vinyl acetate with the solid concentration of 52.6% and viscosity of 6,300 mPa·S was obtained. Results of evaluation of the aqueous emulsion are shown in Tables 1 and 2.

Example 11

Into a 1-liter glass polymerization vessel provided with a reflux condenser, a dropping funnel, a thermometer and a nitrogen inlet port were charged 400 g of ion-exchanged water and 36 g of ethylene modified PVA (degree of polymerization: 1,000; degree of hydrolysis: 95.0 mol %; ethylene content: 6.0 mol %), the resultant mixture was completely dissolved at 95° C. This aqueous solution of the modified PVA was subsequently cooled and bubbled with nitrogen before added with 32 g of vinyl acetate and 8 g of n-butyl acrylate. The system was heated to 70° C., and polymerization was started using potassium persulfate as the initiator. After heat generation due to polymerization was confirmed, 288 g of vinyl acetate and 72 g of n-butyl acrylate were continuously added in three hours to complete the polymerization. Stable aqueous emulsion of copolymer comprising vinyl acetate and n-butyl acrylate was obtained with the solid concentration of 50.5 and viscosity of 2,000 mPa·S.

Comparative Examples 1 to 12

Emulsion polymerization was conducted in the same manner as described for Example 1 except that the dispersant and polymerization conditions listed in Table 3 were employed. Resultant aqueous emulsions were evaluated. The results are shown in Tables 3 and 4.

Examples 9A to 11A

In Examples 9A through 11A, aqueous emulsions obtained in Examples 9 through 11 respectively were evaluated for their performances as adhesive for paper, wood work and plastics using the methods described below. The results are shown in Tables 5 through 7.

(1) Performance as adhesive for paper

Using a bar coater, 20 g/m$^2$ (wet weight of application) each of the adhesives was applied on a sheet of kraft paper and pasted with another sheet of paper of the same kind. Test specimen was prepared by lightly pressing the bonded sheets of paper with a hand roller for adhesion and curing the same for 24 hours at 20° C. and the relative humidity (RH) of 65%.

Water resistance test (boiling test):

The specimen was cut into 25 mm wide strips. Portions of the sheets of paper where no adhesive was applied opened. One end of one of the sheets was fixed and an end of the other sheet was attached with a weight of 10 g. The specimen was immersed in boiling water for 10 minutes and measured for the length the sheet of paper peeled off.

(2) Performance as adhesive for wood work

Test specimen was prepared by bonding sheets of wood (birch tree) under the following conditions to evaluate the performance as adhesive for wood.

[Bonding conditions]

Material used: birch—birch (straight grain), water content 8%

Amount applied: 150 g/m² (applied on both surfaces)

Open time: one minute

Compression: 20° C., 24 hours, 10 kg/cm²

[Measurement conditions]

Compressive Shear Strength Test according to JIS K-6852

Strength under normal state:

Specimen was cured at 20° C. for seven days and then tested according to JIS K-6852

Strength after immersion in water:

Specimens were cured at 20° C. for seven days, immersed in water at 20° C. for three hours, and tested while still wet.

Strength after immersion in hot water:

specimen was cured at 20° C. for seven days, immersed in hot water at 60° C. for three hours, cooled in water at 20°, and then tested while wet (3) Performance as adhesive for plastics Specimen was prepared by bonding a sheet of paper with a sheet of polypropyrene (PP) film and tested under the following conditions.

[Adhesion conditions]

Material used: kraft paper—oriented polypropyrene (OPP) film (20 μm)

Amount applied: 30 g/m²

Open time: 0 minute

Compression: Lightly compressed using a rubber band roller

[Measurement conditions]

Strength under normal state:

Specimen was cured at 20° C. for seven days, manually peeled off and observed

Water resistance:

Specimen was cured at 20° C. for seven days, immersed in water at 20° C. for 24 hours, manually peeled off and tested.

TABLE 1

| | | Dispersant | | | | | Emulsion Polymerization | | |
|---|---|---|---|---|---|---|---|---|---|
| | | Et.[1] content (mol %) | DH[2] (mol %) | DP[3] | Surface tension (dyne/cm) | Amt.[4] of PVA (phr) | Poly.[5] time (h) | Conc.[6] (%) | Viscosity[7] η 20 rpm (mPa · S) |
| | PVA | | | | | | | | |
| Example 1 | PVA-1 | 5.5 | 99.9 | 1400 | 57.9 | 13 | 4.5 | 50.4 | 23000 |
| Example 2 | PVA-2 | 7.1 | 95.4 | 1700 | 52.1 | 10 | 4.5 | 50.1 | 36800 |
| Example 3 | PVA-3 | 8.8 | 99.2 | 1400 | 59.9 | 10 | 4.5 | 50.2 | 17600 |
| Example 4 | PVA-4 | 3.0 | 97.0 | 1700 | 57.3 | 10 | 4.5 | 49.7 | 27900 |
| Example 5 | PVA-5 | 4.5 | 98.5 | 500 | 58.1 | 13 | 4.0 | 52.0 | 15700 |
| Example 6 | PVA-6 | 3.0 | 99.1 | 2000 | 60.5 | 9 | 4.5 | 48.1 | 11500 |
| Example 7 | PVA-7 | 8.4 | 97.5 | 780 | 53.6 | 13 | 4.5 | 51.2 | 14800 |
| Example 8 | PVA-8 | 2.3 | 98.0 | 1200 | 59.2 | 13 | 4.5 | 50.8 | 23000 |
| Example 9 | PVA-9 | 4.5 | 98.5 | 1400 | 59.9 | 10 | 3.3 | 50.4 | 4500 |
| Example 10 | PVA-10 | 3.0 | 98.7 | 1750 | 60.3 | 6 | 2.0 | 52.6 | 6300 |
| Example 11 | PVA-11 | 6.0 | 95.0 | 1000 | 52.2 | 9 | 3.0 | 50.0 | 2000 |

[1]Et. cont.: Ethylene unit content
[2]DH: Degree of hydrolysis
[3]DP: Degree of polymerization
[4]Amt. of PVA: Amount of PVA used as a dispersant
[5]Poly. time: Polymerization time
[6]Conc.: Solid concentration
[7]Viscosity: Brookfield viscosity at 30° C., 20 rpm

TABLE 2

| | Emulsion Viscosity after Adjustment (mPa · S) | | | | Emulsion Performance | |
|---|---|---|---|---|---|---|
| | 30° C., 2 rpm (η 2 rpm) | 30° C., 20 rpm (η 20 rpm, 30 deg) | 0° C., 20 rpm (η 0 deg) | Structural viscosity value (η 2 rpm/η 20 rpm) | Water resistant adhesion properties | Low-temperature stability |
| Example 1 | 8400 | 7600 | 45000 | 1.11 | ⊙ | ⊙ |
| Example 2 | 10600 | 8700 | 48600 | 1.22 | ⊙ | ⊙ |
| Example 3 | 6600 | 6400 | 41000 | 1.03 | ⊙ | ⊙ |
| Example 4 | 9800 | 7400 | 45100 | 1.32 | ⊙ | ⊙ |
| Example 5 | 8100 | 6900 | 43500 | 1.17 | ⊙ | ⊙ |

TABLE 2-continued

| | Emulsion Viscosity after Adjustment (mPa · S) | | | | Emulsion Performance | |
|---|---|---|---|---|---|---|
| | 30° C., 2 rpm (η 2 rpm) | 30° C., 20 rpm (η 20 rpm, 30 deg) | 0° C., 20 rpm (η 0 deg) | Structural viscosity value (η 2 rpm/η 20 rpm) | Water resistant adhesion properties | Low-temperature stability |
| Example 6  | 8600 | 8000 | 51200 | 1.08 | ⊙ | ⊙ |
| Example 7  | 7700 | 7100 | 41200 | 1.08 | ⊙ | ⊙ |
| Example 8  | 9600 | 7500 | 45000 | 1.28 | ⊙ | ⊙ |
| Example 9  | 6900 | 5800 | 35400 | 1.19 | ⊙ | ⊙ |
| Example 10 | 7300 | 6300 | 39700 | 1.16 | ⊙ | ⊙ |
| Example 11 | 9000 | 6100 | 33600 | 1.48 | ⊙ | ⊙ |

TABLE 3

| | Dispersant | | | | | Emulsion Polymerization | | |
|---|---|---|---|---|---|---|---|---|
| | PVA | Et.[1] cont. (mol %) | DH[2] (mol %) | DP[3] | Surface tension (dyne/cm) | Amt.[4] of PVA | Poly.[5] time (h) | Conc.[6] | Viscosity[7] η 20 rpm (mPa · S) |
| Comp. Ex. 1  | PVA-12 | 0    | 98.5 | 1400 | 62.3     | 13 | 4.5 | 50.3 | 27100 |
| Comp. Ex. 2  | PVA-13 | 0    | 97.8 | 1700 | 61.4     | 10 | 4.5 | 50.0 | 28200 |
| Comp. Ex. 3  | PVA-14 | 0    | 96.3 | 1400 | 57.4     | 10 | 4.5 | 50.2 | 30100 |
| Comp. Ex. 4  | PVA-15 | 0    | 88.1 | 1400 | 47.2     | 10 | 4.5 | 49.7 | 39300 |
| Comp. Ex. 5  | PVA-16 | 7.2  | 90.0 | 1200 | 42.8     | 10 | 4.0 | 48.6 | 16400 |
| Comp. Ex. 6  | PVA-17 | 10.0 | 85.0 | 500  | 38.0     | 10 | 4.5 | 48.1 | 13900 |
| Comp. Ex. 7  | PVA-18 | 4.0  | 94.0 | 1700 | 51.6     | 10 | 4.5 | 50.2 | 38400 |
| Comp. Ex. 8  | PVA-19 | 5.6  | 95.3 | 500  | 50.8     | 13 | 4.5 | 50.8 | 28100 |
| Comp. Ex. 9  | PVA-20 | 8.7  | 95.0 | 1700 | 49.0[9]  | 10 | 4.0 | 51.0 | 32700 |
| Comp. Ex. 10 | PVA-21 | 9.8  | 98.8 | 1700 | 58.0[9]  | 9  | 4.5 | *    | *     |
| Comp. Ex. 11 | PVA-22 | 1.5  | 99.0 | 1700 | 61.6     | 10 | 4.5 | 50.2 | 13800 |
| Comp. Ex. 12 | PVA-23[8] | 0 | 98.1 | 1400 | 60.1[9]  | 10 | 4.5 | 47.6 | 19400 |

[1]–[7]: See Table 1 for description of the abbreviations.
[8]PVA-23: PVA modified with 1 mol % sulfonic acid
[9]As the dispersant does not completely dissolve in water, measurement was conducted after removing the undissolved part.

TABLE 4

| | Emulsion Viscosity after Adjustment (mPa · S) | | | | Emulsion Performance | |
|---|---|---|---|---|---|---|
| | 30° C., 2 rpm (η 2 rpm) | 30° C., 20 rpm (η 20 rpm, η 30 deg) | 0° C., 20 rpm (η 0 deg) | Structural viscosity value (η 2 rpm/η 20 rpm) | Water resistant adhesion properties | Low-temp. stability |
| Comp. Ex. 1  | 9400  | 7700 | 229000 | 1.22 | Δ | X |
| Comp. Ex. 2  | 10800 | 7400 | 109000 | 1.46 | Δ | Δ |
| Comp. Ex. 3  | 17800 | 8900 | 83700  | 2.00 | Δ | Δ |
| Comp. Ex. 4  | 25600 | 7500 | 45700  | 3.41 | X | ⊙ |
| Comp. Ex. 5  | 17000 | 7100 | 43300  | 2.39 | X | ⊙ |
| Comp. Ex. 6  | 21100 | 6900 | 40000  | 3.06 | X | ⊙ |
| Comp. Ex. 7  | 17300 | 8100 | 48600  | 2.14 | Δ | ⊙ |
| Comp. Ex. 8  | 15400 | 7600 | 45600  | 2.03 | Δ | ⊙ |
| Comp. Ex. 9  | 13680 | 7200 | 44600  | 1.90 | Δ | ⊙ |
| Comp. Ex. 10 | *     | *    | *      | *    | * | * |
| Comp. Ex. 11 | 11600 | 7500 | 153000 | 1.55 | Δ | X |
| Comp. Ex. 12 | 22100 | 8400 | 49100  | 2.63 | X | ⊙ |

TABLE 5

Performance as Adhesive for Paper (boiling test) (mm)

| Example 9A  | 0 |
|---|---|
| Example 10A | 0 |
| Example 11A | 0 |

TABLE 6

Performance as Adhesive for Wood (adhesion strength) (kg/cm²)

| | normal state | water resistance | hot water resistance |
|---|---|---|---|
| Example 9A  | 115 (40) | 65 (15) | 40 (5) |
| Example 10A | 95 (35)  | 60 (10) | 45 (5) |
| Example 11A | 90 (30)  | 55 (15) | 35 (5) |

The figure in parentheses indicates the percentage of adhesion area where wood was broken.

TABLE 7

| | Performance as adhesive for plastics | |
|---|---|---|
| | normal state | water resistance |
| Example 9A | partly broken[1] | partly broken[1] |
| Example 10A | partly broken[1] | partly broken[1] |
| Example 11A | partly broken[1] | partly broken[1] |

[1]Kraft paper was broken in some part of adhesion area.

What we claim is:

1. An aqueous emulsion comprising a dispersant of a modified polyvinyl alcohol with an ethylene unit content of 2 to 9 mol % and a degree of hydrolysis of at least 95 mol %, a dispersoid of a polymer of an ethylenically unsaturated monomer, and a ratio (η2 rpm/η20 rpm) of Brookfield viscosity at 30° C., 2 rpm (η2 rpm) as against Brookfield viscosity at 30° C., 20 rpm (η20 rpm) being 1 to 1.8 when the latter viscosity (η20 rpm) is adjusted to 5,000 to 10,000 mPa·S.

2. An adhesive comprising an aqueous emulsion according to claim 1.

3. The adhesive of claim 2, further comprising at least one member selected from the group consisting of toluene, tetrachloroethylene, dichlorobenzene, trichlorobenzene, starch, modified starch, oxidized starch, sodium alginate, carboxymethyl cellulose, methyl cellulose, hydroxymethyl cellulose, copolymers of maleic anhydride and isobutene, copolymers of maleic anhydride and styrene, copolymers of maleic anhydride and methyl vinyl ether, urea-formalin resin, urea-melamine-formalin resin and phenol-formalin resin.

4. The adhesive of claim 2, further comprising at least one member selected from the group consisting of clay, kaolin, talc, calcium carbonate, wood meal, flour, boric acid and aluminum sulfate.

5. The adhesive of claim 2, wherein said modified polyvinyl alcohol has an ethylene unit content of 3–8 mol %.

6. The aqueous emulsion of claim 1, wherein said modified polyvinyl alcohol has an ethylene unit content of 3–8 mol %.

7. The aqueous emulsion of claim 1, wherein said modified polyvinyl alcohol has a degree of polymerization of 100 to 8,000.

8. The aqueous emulsion of claim 1, wherein said modified polyvinyl alcohol has a degree of polymerization of 300 to 3,000.

9. The aqueous emulsion of claim 1, wherein an aqueous solution of said modified polyvinyl alcohol at 1 wt %, at 20° C., has a surface tension of 52–61 dyne/cm.

10. The aqueous emulsion of claim 1, further comprising one member selected from the group consisting of anionic surfactants, nonionic surfactants, cationic surfactants, PVA and hydroxyethyl cellulose.

11. The aqueous emulsion of claim 1, wherein said ethylenically unsaturated monomer is selected from the group consisting of vinyl esters, a combination of ethylene and vinyl ester and a combination of vinyl ester and (meth-)acrylic ester.

12. The aqueous emulsion of claim 1, wherein said ratio is 1 to 1.4.

13. The aqueous emulsion of claim 1, wherein said ratio is 1 to 1.3.

14. The aqueous emulsion of claim 1, wherein said aqueous emulsion has a solids content of 40 to 60 wt %.

15. The aqueous emulsion of claim 1, wherein said dispersoid has a particle diameter of 0.01 to 5 μm.

16. The aqueous emulsion of claim 1, wherein said modified polyvinyl alcohol is present in an amount of 2–20 weight parts as against 100 parts by weight of said ethylenically unsaturated monomer.

17. A dispersant for emulsion polymerization of ethylenically unsaturated monomer comprising a modified polyvinyl alcohol with an ethylene unit content of 2 to 9 mol % and a degree of hydrolysis of at least 95 mol %.

18. The dispersant of claim 17, wherein said modified polyvinyl alcohol has an ethylene unit content of 3–8 mol %.

19. The dispersant of claim 17, wherein said modified polyvinyl alcohol has a degree of polymerization of 300 to 3,000.

20. The dispersant of claim 17, wherein said modified polyvinyl alcohol is modified with ethylene alone.

* * * * *